United States Patent [19]

Mehring et al.

[11] Patent Number: 5,222,222

[45] Date of Patent: Jun. 22, 1993

[54] APPARATUS AND METHOD FOR A SPACE SAVING TRANSLATION LOOKASIDE BUFFER FOR CONTENT ADDRESSABLE MEMORY

[75] Inventors: Peter A. Mehring, Wilmington; Robert D. Becker, Shirley, both of Mass.

[73] Assignee: Sun Microsystems, Inc., Mountain View, Calif.

[21] Appl. No.: 629,258

[22] Filed: Dec. 18, 1990

[51] Int. Cl.⁵ .............. G06F 12/06; G06F 12/08; G06F 12/10; G06F 12/14
[52] U.S. Cl. .............................. 395/400; 395/425; 364/DIG. 1; 364/DIG. 2
[58] Field of Search ................. 395/400, 425

[56] References Cited

U.S. PATENT DOCUMENTS

| | | | |
|---|---|---|---|
| 4,285,040 | 8/1981 | Carlson et al. | 395/400 |
| 4,680,700 | 7/1987 | Hester et al. | 395/400 |
| 4,835,734 | 5/1989 | Kodaira et al. | 395/400 |
| 4,914,577 | 4/1990 | Stewart et al. | 395/400 |
| 5,058,003 | 10/1991 | White | 395/400 |
| 5,133,058 | 7/1992 | Jensen | 395/400 |

OTHER PUBLICATIONS

Smith, "Cachememories" Computing Surveys, vol. 14, No. 3, Sep. 82, pp. 473-529.

*Primary Examiner*—Joseph L. Dixon
*Assistant Examiner*—Michael A. Whitfield
*Attorney, Agent, or Firm*—Blakely Sokoloff Taylor & Zafman

[57] ABSTRACT

A method and apparatus for saving memory space in a buffer whereby the valid bit in the entry of the translation lookaside buffer for a cache memory is collapsed into one of the level bits indicating the length of the virtual address. During the lookup of the translation lookaside buffer, the virtual address in each entry is compared with the virtual address from the CPU if the level/valid bit is set, i.e. the entry is valid. If the level/valid bit is not set, then no compare takes place and the lookup continues to the next entry. The length of the virtual address to be compared is further determined by the status of the remaining level bits.

8 Claims, 3 Drawing Sheets

APPARATUS AND METHOD FOR A SPACE SAVING TRANSLATION LOOKASIDE BUFFER FOR CONTENT ADDRESSABLE MEMORY

BACKGROUND OF THE INVENTION

1. Field of the Invention

The present invention relates to method and apparatus for saving space in a translation lookaside buffer. More specifically, the present invention relates to method and apparatus for saving memory space without compromising the performance of a translation lookaside buffer within the central processing unit (CPU).

2. Art Background

It is quite common for a fast central processor unit to have a cache memory in addition to a main computer memory. The cache memory is smaller, but much faster than the main computer memory. It is placed between the processor and the main memory. During the execution of the software program, the cache memory stores the most frequently utilized instructions and data. Whenever the processor needs to access information from memory, the processor examines the cache first before accessing the main computer memory. A cache miss occurs if the processor cannot find instructions or data in the cache memory and is required to access the slower main memory. Thus, the cache memory reduces the average memory access time of the processor. For further information on cache memories, please refer to Alan J. Smith's article on *Cache Memories*, Computing Survey, Vol. 14, No. 3, September 1982.

Virtual addressing provides increased flexibility and capability to a system. For example, through virtual addressing a larger address space is achieved as well as insolation of the software from physical addressing by providing a virtual address space in which the software operates. In order to implement virtual addressing, a mechanism is needed to translate the virtual addresses to physical addresses. Many CPUs contain a translator, which translates virtual addresses to physical memory addresses, and a translation lookaside buffer (TLB), which caches recently generated virtual-physical address pairs. The TLBs are essential because they allow faster access to the main memory by skipping the mapping process when the translation pairs already exist.

The operation of a cache begins with the arrival of a virtual address, usually from the CPU, and the appropriate control signal. The virtual address is passed to both the TLB and the cache memory. The TLB accepts the virtual page number and uses it to select a set of elements, which is then searched associatively for a match to the virtual address. If a match is found, the corresponding physical address is passed to the comparator to determine whether the data is in the cache.

If the TLB does not contain the virtual-physical address pair needed for the translation, then the address translator is invoked. The translator uses the high-order bits of the virtual address as an entry into the segment and page tables, which may be in either the cache or the main memory, for the process and then returns the address pair to the TLB, thus replacing an existing TLB entry.

A TLB entry contains a number of fields. The virtual address presented for translation is matched against the virtual address tag field in the TLB to ensure that the right entry has been found. The virtual address tag field contains an Address Space Identifier (ASID) so that entries for more than one process can be in the TLB at one time. In some machines such as the IBM 370, a protection field is included and is checked to ensure that the access is permitted.

There is also a bit in the TLB that indicates whether a given entry in the TLB is valid. This bit is called a Valid bit. As each entry is entered into the TLB, the corresponding valid bit in the entry is set. During a TLB compare function, if the status of the valid bit is reset, then no compare takes place for that entry. If the valid bit is set, then a compare function can proceed. In some TLB designs, there are bits allocated to indicate the length of the virtual address in the virtual address tag to be compared, since each length may represent a different function.

Because some TLBs are content addressable memories (CAM), they are usually four times as large as their random access memory (RAM) counterpart. This is due to the built-in associative mathematical logic in the transistors, which operate a "compare" function instead of a "hold" function. Therefore, it becomes highly desirable to conserve space in the TLB CAM without any impact on its performance.

SUMMARY OF THE INVENTION

It is an object of the present invention to provide a method and apparatus for saving space in the TLB CAM without compromising its performance.

A method and apparatus are disclosed for saving space in a buffer for a cache memory unit, specifically, the translation lookaside buffer (TLB). In the method and apparatus of the present invention, memory space is saved in the TLB by collapsing the valid bit into one of the level bits. The disclosed invention is particularly useful, and the memory savings are more significant, because a CAM bit is about four times the size of a random access memory (RAM) bit due to the associative mathematical logic structure of the CAM circuitry.

BRIEF DESCRIPTION OF THE DRAWINGS

The objects, features and advantages of the present invention are apparent from the following detailed description of the invention in which.

DETAILED DESCRIPTION OF THE INVENTION

A method and apparatus for saving space in the TLB of a cache memory is disclosed. In the following description, numerous specific details are set forth to provide a thorough understanding of the present invention. However, it will be obvious to one skilled in the art that the present invention may be practiced without these specific details. In other instances, well-known circuits and structures are not described in detail in order not to obscure the present invention unnecessarily.

Figure 1:
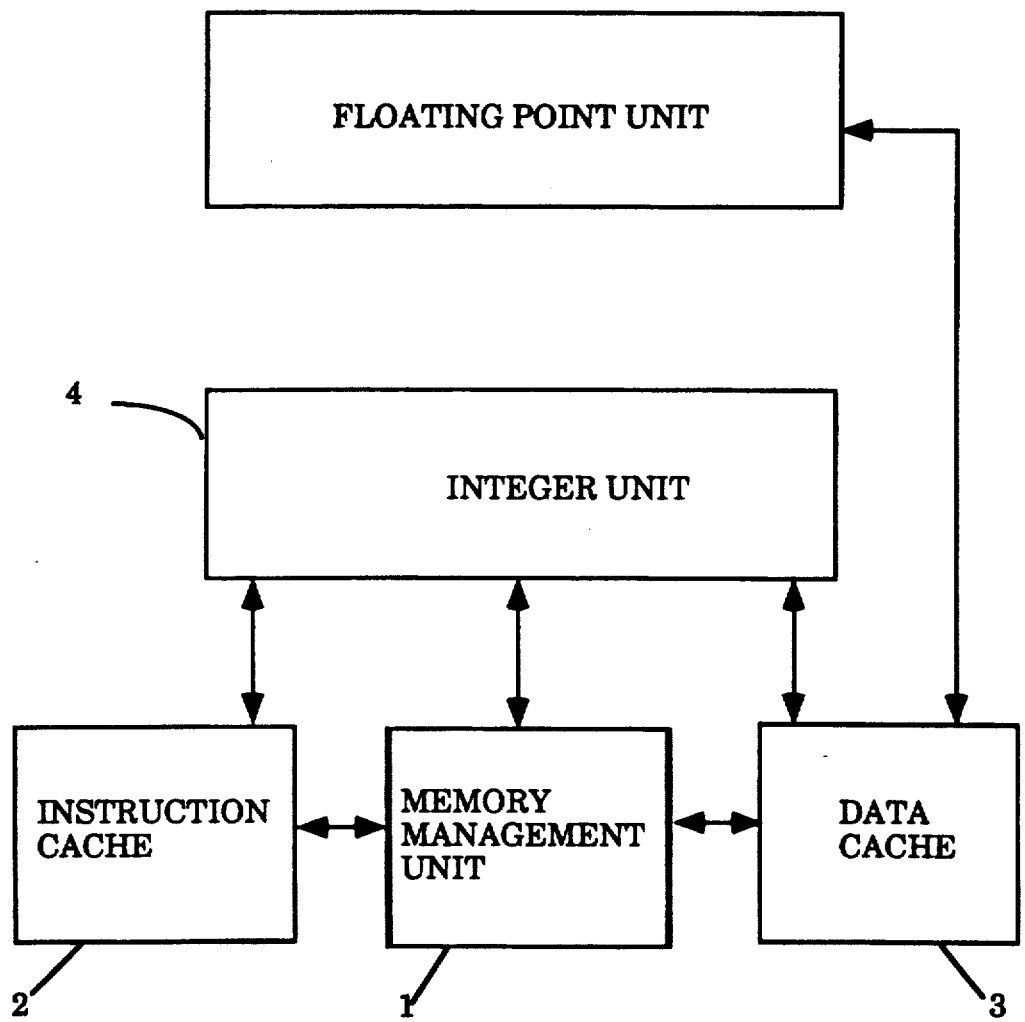
FIG. 1 illustrates the memory management unit in a processor.

FIG. 1 is a conceptional block diagram of the memory management unit (MMU) 1 within a processor. The MMu is coupled to an instruction cache 2, a data cache 3, an integer unit 4, and other control logic (not shown). For further information regarding the processor structure, please refer to Hennessy, J. L., Patterson, D. A.

*Computer Architecture: A Quantitative Approach.* (Morgan Kaufman, San Mateo, Calif., 1990).

Figure 2:
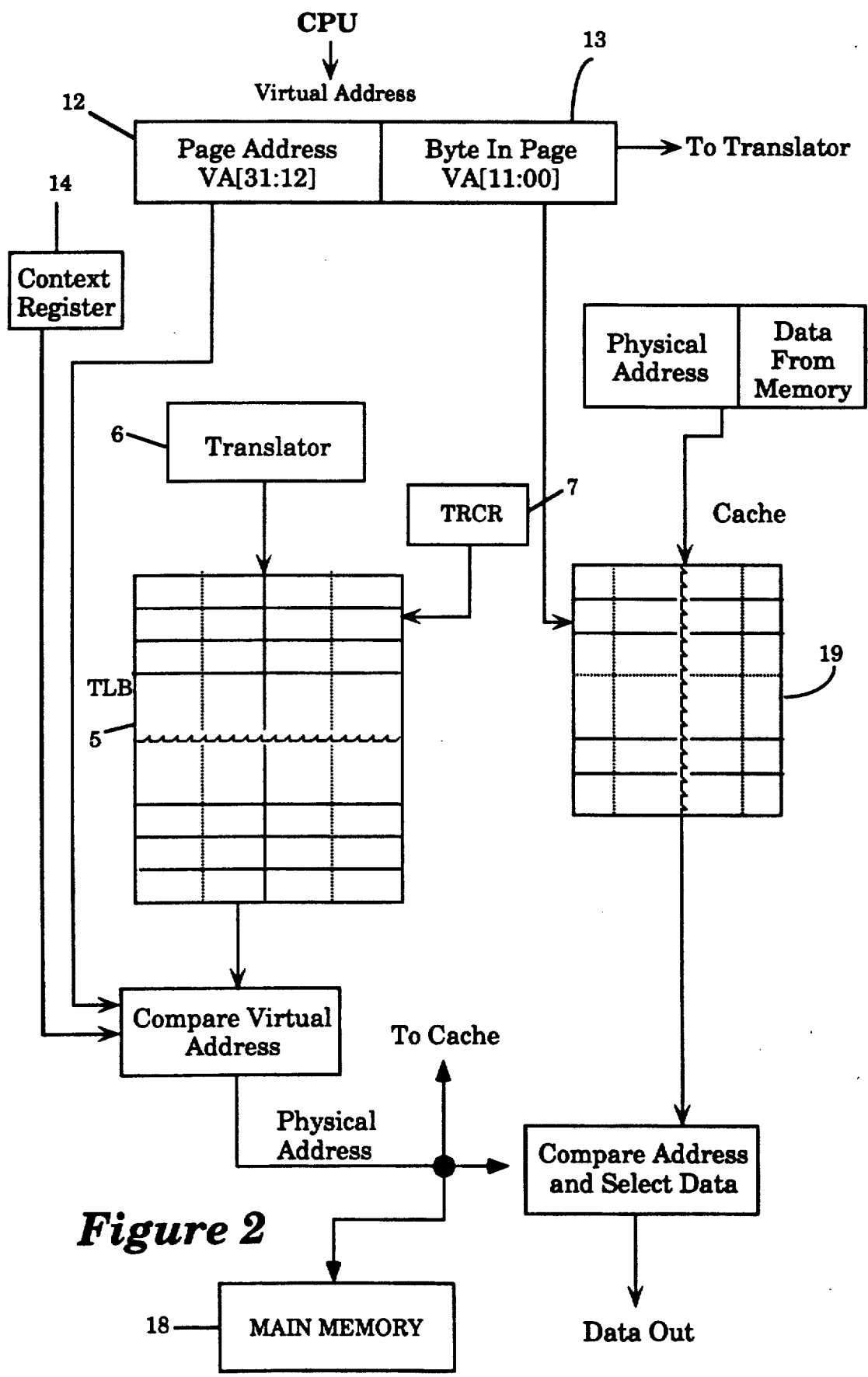
FIG. 2 illustrates a conceptional block diagram of the TLB of the present invention and the cache memory.

MMU 1 provides four primary functions. First, it translates virtual addresses of each running process to physical addresses in memory. In the preferred embodiment, the MMU provides translation from a 32-bit virtual address 12, 13 to a 31-bit physical address by using a translation lookaside buffer (TLB) 5 as shown in FIG. 2. The three high order bits of the physical address are maintained to support memory mapping into eight different address spaces. The MMU supports the use of 64 contexts. Second, the MMU provides memory protection so that a process can be prohibited from reading or writing the address space of another process. Page protection and usage information is fully supported. Third, the MMU implements virtual memory. The page tables are maintained in main memory 18. When a miss occurs in the TLB 5, a table walk is handled in hardware and new virtual-to-physical address translation is loaded into the TLB 5, via a translator 6. Finally, the MMU performs the arbitration function between I/O, data cache 3, instruction cache 2, and TLB references to memory 18.

In the description that follows, the terms VA and PA are used to generically describe any virtual address and physical address respectively. The TLB 5 is a 32 entry, fully associative cache of page descriptors. It caches virtual to physical address translations and the associated page protection and usage information. A pseudo random replacement algorithm determines which of the 32 entries should be replaced when needed.

The pseudo random replacement scheme typically operates in the following manner: there is a 5 bit modulo 32 counter in a TLB replacement control register (TRCR) 7 which is incremented by one during each central processing unit (CPU) clock cycle to address one of the TLB 5 entries. When a TLB miss occurs, the counter value is used to address the TLB entry to be replaced. On reset, the counter in initialized to zero. There is also a bit in the TRCR 7 which is used to disable the counting function.

Figure 3:
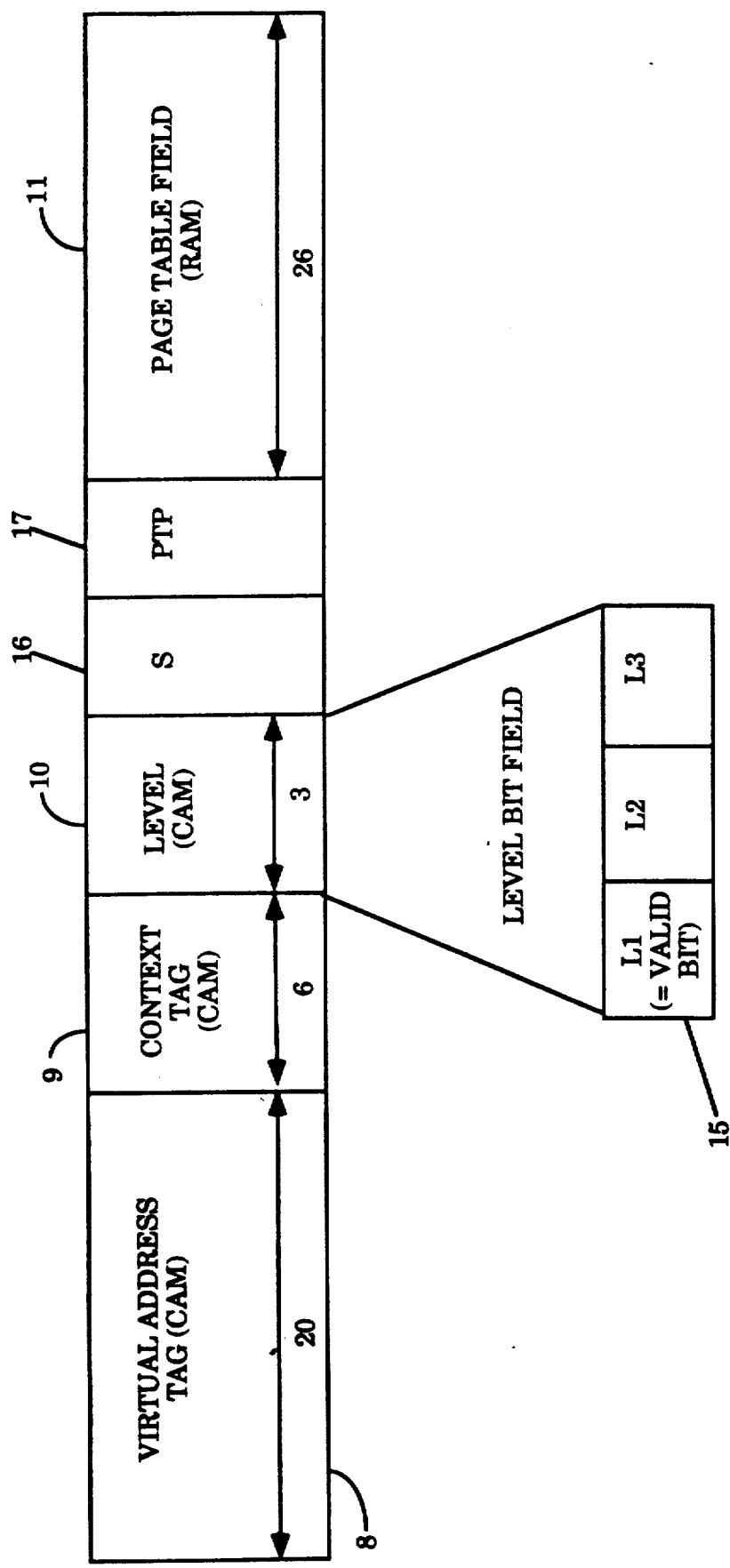
FIG. 3 illustrates the fields of an entry in the TLB of the present invention.

FIG. 3 shows the fields within an entry of the TLB, which include a Virtual Address Tag 8, a Context Tag 9, a Page Table Entry (PTE) Level Field 10, and a Page Table Field 11.

As shown in FIG. 3, the 20-bit Virtual Address Tag 8 represents the most significant 20 bits of the virtual address (VA[31:12]) being used when referencing Page Table Entries (PTEs) and I/O Page Table Entries (I/OPTEs) (discussed below). Not included in the TLB entry is the virtual address VA[11:0], which selects the byte within a page in the cache memory 19. The address in the VA tag field is physical when referencing Page Table Pointers (PTPs) with 20 bits PA[27:08].

A 3-bit Level Field 10 is used to enable the proper virtual tag match of region and segments PTEs. I/OPTEs and PTPs will have this field set to use Index 1, 2 and 3, as explained in the table below. The most significant bit 15 is also serves as the TLB Valid Bit because it is enabled for any valid PTE, I/OPTE or PTP. The following table defines the Level Field:

| LEVEL FIELD | VIRTUAL TAG MATCH CRITERIA |
| --- | --- |
| 000 | None |
| 100 | Index 1 (VA[31:24]) |
| 110 | Index 1, 2 (VA[31:18]) |

-continued

| LEVEL FIELD | VIRTUAL TAG MATCH CRITERIA |
| --- | --- |
| 111 | Index 1, 2, 3 (VA[31:12]) |

Referring again to FIG. 3, a Supervisor (S) Bit 16 is used to disable the matching of the context field indicating that a page is a supervisor level.

A Page Table Pointer (PTP) bit 17 indicates that PTP resides in this entry of the TLB.

The Page Table Field can either be a) a Page Table Entry (PTE), b) a Page Table Pointer (PTP), or c) an I/O Page Table Entry (I/OPTE). A PTE defines both the physical address of a page and its access permissions. A PTP contains the physical address of a page table and may be found in the Context Table, in a level 1 Page Table, or in a Level 2 Page Table. Page Table Pointers are put into the TLB during tablewalks and removed from the TLB either by natural replacement (also during tablewalks) or by flushing the entire TLB. An I/OPTE defines both the physical address of a page and its access permissions.

Referring now to FIG. 2, the 6-bit Context Tag 9 is written from the value in the Context Register (CXR) 14 by memory management software when referencing PTEs. Both the Context Tag 9 and the Virtual Address Tag 8 must match the CXR 14 and virtual address VA[31:12] 12 to have a TLB hit. The Context Field contains a physical address PA[07:02] when referencing PTPs. This field is not used when referencing I/OPTEs.

A virtual address 12 to be translated by MMU 1 is compared to each entry in the TLB 5. During the TLB look-up the value of the Level Field 10 specifies which index fields are required to match the TLB virtual tag according to the above-described match criteria table.

The Level Bits describe not only the size of the virtual page, but also which part of the virtual tag is relevant to compare.

According to the principle of the present invention, one of the Level Bits 10 also functions as a Valid Bit, which indicates whether the entry in the TLB is valid. In this embodiment, the most significant bit L1 15 is enabled for each valid entry. When the status of the L1 bit is dis-enabled, no compare takes place because the entry is not valid. When it is enabled, then the length to be matched will have to be determined according to the Virtual Tag Match Criteria. For an enabled L1 bit, Index 1 is invoked and therefore VA[31:24] is compared. For enabled L1 and L2 bits, VA[31:18] is compared. And for enabled L1, L2, and L3 bits, VA[31:12] is compared. Therefore, for a valid entry in the TLB, the L1 Bit is enabled. Then the remaining Level Bits are enabled according to the Virtual Tag Match Criteria: None are enabled for the virtual tag of VA[31:24] and the Level Field is set to "100." The L2 Bit is enabled for the virtual tag of VA[31:18] and the Level Field is set to "110." Finally, the L2 and L3 Bits are enabled for the virtual tag of VA[31:12] and the Level Field is set to "111." With the arrival of a virtual address from the processor, the L1 Bit is checked for validity first. If the L1 Bit is set, then the length of the tag to be compared with will be determined according to the status of the remaining Level Bits. Applying the present invention, the need for a valid bit in the CAM TLB is eliminated by collapsing the Valid Bit into the L1 Level Bit, and the performance of the TLB is not compromised.

We claim:

1. In a computer system comprising a random access memory and a fast cache memory, said cache memory containing frequently referenced data from the random access memory, said system first referencing the cache memory to retrieve data and referencing the random access memory only if the data is not in the cache memory, a method for saving space in address entries of a buffer for the cache memory, each of said address entries comprising a virtual address tag field for virtual address tags, and a level bit field comprising a plurality of bits, said address tag field identifying a virtual address, said level bit field identifying the length of a virtual address tag, said method comprising the steps of:
   storing data in the cache memory, comprising the steps of;
      providing an entry in said buffer for data stored in the cache,
      setting a first level bit for a valid entry, and
      setting remaining level bits in said level bit field according to a predetermined virtual tag match criteria, said predetermined criteria being based on the length of said virtual address tag in said address tag field;
   accessing data in the cache memory, comprising the steps of;
      receiving a virtual address from a processor,
      reading the status of said first level bit in the address entry in the buffer,
      if the first level bit is reset, reading a next entry in said buffer, and
      if the first level bit is set, causing said valid entry to be compared with said virtual address tag from said processor, the length of said virtual address tag in said entry being determined by the status of all level bits according to said predetermined virtual tag match criteria;
   whereby if the virtual address matches an entry in the buffer, a corresponding physical address is outputted and data is retrieved from the cache.

2. The method as defined by claim 1 wherein the level bit field is stored in content addressable memory.

3. The method as defined by claim 2 wherein said buffer is a translation lookaside buffer for said cache memory.

4. The method as defined by claim 3 wherein said remaining level bits are set according to the predetermined virtual tag match criteria such that one level bit is set to indicate the eight (8) most significant bits of a thirty two (32) bit virtual address, two level bits are set to indicate the fourteen (14) most significant bits in said thirty two (32) bit virtual address, and three level bits are set to indicate the twenty (20) most significant bits of said 32 bit virtual address, respectively, represent the virtual address tag field.

5. In a computer system comprising a random access memory and a fast cache memory, said cache memory containing frequently referenced data from the random access memory, said system first referencing the cache memory to retrieve data and referencing the random access memory only if the data is not in the cache memory, an apparatus for saving spaced in address entries of a buffer for a cache memory, each of said entries comprising a virtual address tag field for virtual address tags, and a level bit field comprising a plurality of bits, said address tag field identifying a virtual address, said level bit field identifying the length of a virtual address tag, said apparatus comprising:
   means for storing data in the cache memory, comprising;
      means for providing an entry in said buffer for data stored in the cache,
      means for setting a first level bit for a valid entry, and
      means for setting remaining level bits in said level bit field according to a predetermined virtual tag match criteria, said predetermined criteria being based on the length of said virtual address tag in said address tag field;
   means for accessing data in the cache memory, comprising;
      means for receiving a virtual address from a processor,
      means for reading the status of said first level bit in the address entry in the buffer,
      if the first level bit is reset, means for reading a next entry in said buffer,
      if the first level bit is set, means for causing said valid entry to be compared with said virtual address tag from said processor, the length of said virtual address tag in said entry being determined by the status of all level bits according to said predetermined virtual tag match criteria;
   whereby if the virtual address matches the entry in the buffer, a corresponding physical address is outputted and the data is retrieved from the cache.

6. The apparatus is defined by claim 5 wherein said bit field is stored in content addressable memory.

7. The apparatus as defined by claim 6 wherein said buffer is a translation lookaside buffer for said cache memory.

8. The apparatus as defined by claim 7 wherein said remaining level bits are set according to the predetermined virtual tag match criteria such that one level bit is set to indicate the eight (8) most significant bits of a thirty two (32) bit virtual address, two level bits are set to indicate the fourteen (14) most significant bits in said thirty two (32) bit virtual address, and three level bit are set to indicate the twenty (20) most significant bits of said 32 bit virtual address, respectively, represent the virtual address tag field.

* * * * *